US008566300B2

(12) United States Patent
Murthy et al.

(10) Patent No.: US 8,566,300 B2
(45) Date of Patent: Oct. 22, 2013

(54) MECHANISM FOR EFFICIENT MAINTENANCE OF XML INDEX STRUCTURES IN A DATABASE SYSTEM

(75) Inventors: Ravi Murthy, Fremont, CA (US); Sivasankaran Chandrasekar, Palo Alto, CA (US); Eric Sedlar, San Francisco, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2047 days.

(21) Appl. No.: 11/286,873

(22) Filed: Nov. 22, 2005

(65) Prior Publication Data

US 2006/0080345 A1    Apr. 13, 2006

(51) Int. Cl.
*G06F 17/30* (2006.01)
(52) U.S. Cl.
USPC .......................................................... 707/705
(58) Field of Classification Search
USPC .......................................................... 707/705
See application file for complete search history.

(56) References Cited

U.S. PATENT DOCUMENTS

| | | | |
|---|---|---|---|
| 5,210,686 A | 5/1993 | Jernigan | |
| 5,369,763 A | 11/1994 | Biles | |
| 5,404,513 A | 4/1995 | Powers et al. | |
| 5,410,691 A | 4/1995 | Taylor | |
| 5,454,101 A | 9/1995 | Mackay et al. | |
| 5,467,471 A | 11/1995 | Bader | |
| 5,524,240 A | 6/1996 | Barbara et al. | |
| 5,530,849 A | 6/1996 | Hanushevsky et al. | |
| 5,544,360 A | 8/1996 | Lewak et al. | |
| 5,546,571 A | 8/1996 | Shan et al. | |

(Continued)

FOREIGN PATENT DOCUMENTS

| | | |
|---|---|---|
| GB | 2409078 A | 6/2005 |
| WO | WO 42881 A2 | 6/2001 |

(Continued)

OTHER PUBLICATIONS

International Searching Authority, "Notification of Transmittal of the International Search Report and the Written Opinion of the International Searching Authority, or the Declaration," PCT/US2005/021259, dated Nov. 24, 2005, 13 pages.

(Continued)

*Primary Examiner* — Hosain Alam
*Assistant Examiner* — Johnese Johnson
(74) *Attorney, Agent, or Firm* — Hickman Palermo Truong Becker Bingham Wong LLP; Daniel D. Ledesma

(57) ABSTRACT

A method and apparatus for efficiently maintaining XML index structures in a database system is provided. Instead of immediately synchronizing the XML index structures for every change submitted to the database, the changes are stored in a PENDING table. The XML index structures are periodically synchronized, based on certain criteria or at a user's discretion. Between synchronizations, the XML index structures may be in stale mode or current mode. If in stale mode, a request to access indexed information will use the XML index structures to find the desired indexed information without checking the PENDING table. If in current mode, a request to access indexed information will search the XML index structures and also check the PENDING table to determine 1) whether the indexed information has been updated or deleted, and 2) whether information relevant to the request has been inserted or updated.

20 Claims, 3 Drawing Sheets

(56) References Cited

U.S. PATENT DOCUMENTS

| | | | |
|---|---|---|---|
| 5,568,640 A | 10/1996 | Nishiyama et al. | |
| 5,643,633 A | 7/1997 | Telford et al. | |
| 5,680,614 A | 10/1997 | Bakuya et al. | |
| 5,701,467 A | 12/1997 | Freeston | |
| 5,745,904 A * | 4/1998 | King et al. | 707/200 |
| 5,838,965 A | 11/1998 | Kavanagh et al. | |
| 5,842,212 A | 11/1998 | Ballurio et al. | |
| 5,870,590 A | 2/1999 | Kita et al. | |
| 5,878,410 A * | 3/1999 | Zbikowski et al. | 707/2 |
| 5,917,492 A | 6/1999 | Bereiter et al. | |
| 5,921,582 A | 7/1999 | Gusack | |
| 5,974,407 A | 10/1999 | Sacks | |
| 6,055,544 A | 4/2000 | DeRose et al. | |
| 6,101,500 A | 8/2000 | Lau | |
| 6,111,578 A | 8/2000 | Tesler | |
| 6,112,209 A | 8/2000 | Gusack | |
| 6,128,610 A | 10/2000 | Srinivasan et al. | |
| 6,141,655 A | 10/2000 | Johnson et al. | |
| 6,182,121 B1 | 1/2001 | Wlaschin | |
| 6,192,273 B1 | 2/2001 | Igel et al. | |
| 6,192,373 B1 | 2/2001 | Haegele | |
| 6,236,988 B1 | 5/2001 | Aldred | |
| 6,253,195 B1 | 6/2001 | Hudis et al. | |
| 6,279,007 B1 | 8/2001 | Uppala | |
| 6,330,573 B1 | 12/2001 | Salisbury et al. | |
| 6,366,934 B1 | 4/2002 | Cheng et al. | |
| 6,370,537 B1 | 4/2002 | Gilbert et al. | |
| 6,427,123 B1 | 7/2002 | Sedlar | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,519,597 B1 | 2/2003 | Cheng et al. | |
| 6,539,398 B1 | 3/2003 | Hannan et al. | |
| 6,584,459 B1 * | 6/2003 | Chang et al. | 707/3 |
| 6,604,100 B1 | 8/2003 | Fernandez et al. | |
| 6,609,121 B1 | 8/2003 | Ambrosini et al. | |
| 6,636,845 B2 | 10/2003 | Chau et al. | |
| 6,643,633 B2 | 11/2003 | Chau et al. | |
| 6,654,734 B1 | 11/2003 | Mani et al. | |
| 6,684,227 B2 | 1/2004 | Duxbury | |
| 6,697,805 B1 | 2/2004 | Choquier et al. | |
| 6,708,186 B1 | 3/2004 | Claborn et al. | |
| 6,725,212 B2 | 4/2004 | Couch et al. | |
| 6,782,380 B1 | 8/2004 | Thede | |
| 6,826,727 B1 | 11/2004 | Mohr et al. | |
| 6,836,857 B2 | 12/2004 | Ten-Hove et al. | |
| 6,920,457 B2 | 7/2005 | Pressmar | |
| 7,031,956 B1 | 4/2006 | Lee et al. | |
| 7,043,716 B2 | 5/2006 | Zimmer et al. | |
| 7,062,507 B2 | 6/2006 | Wang et al. | |
| 7,139,746 B2 | 11/2006 | Shin et al. | |
| 7,162,485 B2 | 1/2007 | Gottlob et al. | |
| 7,171,407 B2 | 1/2007 | Barton et al. | |
| 7,216,127 B2 | 5/2007 | Auerbach | |
| 2001/0037345 A1 | 11/2001 | Kiernan et al. | |
| 2001/0049675 A1 | 12/2001 | Mandler et al. | |
| 2002/0073019 A1 | 6/2002 | Deaton | |
| 2002/0078068 A1 | 6/2002 | Krishnaprasad et al. | |
| 2002/0100027 A1 | 7/2002 | Binding et al. | |
| 2002/0116457 A1 | 8/2002 | Eshleman et al. | |
| 2002/0143512 A1 | 10/2002 | Shamoto et al. | |
| 2002/0156811 A1 | 10/2002 | Krupa | |
| 2002/0184188 A1 | 12/2002 | Mandyam et al. | |
| 2002/0184401 A1 | 12/2002 | Kadel, Jr. et al. | |
| 2002/0188613 A1 | 12/2002 | Chakraborty et al. | |
| 2003/0009361 A1 | 1/2003 | Hancock et al. | |
| 2003/0065659 A1 | 4/2003 | Agarwal et al. | |
| 2003/0078906 A1 | 4/2003 | Ten-Hove et al. | |
| 2003/0101194 A1 | 5/2003 | Rys et al. | |
| 2003/0131051 A1 | 7/2003 | Lection et al. | |
| 2003/0177341 A1 | 9/2003 | Devillers | |
| 2003/0200214 A1 | 10/2003 | Doole et al. | |
| 2003/0212662 A1 | 11/2003 | Shin et al. | |
| 2003/0212664 A1 | 11/2003 | Breining et al. | |
| 2003/0233618 A1 | 12/2003 | Wan | |
| 2004/0010752 A1 | 1/2004 | Chan et al. | |
| 2004/0015783 A1 | 1/2004 | Lennon et al. | |
| 2004/0044659 A1 | 3/2004 | Judd et al. | |
| 2004/0064466 A1 | 4/2004 | Manikutty et al. | |
| 2004/0068494 A1 | 4/2004 | Tozawa et al. | |
| 2004/0088320 A1 | 5/2004 | Perry | |
| 2004/0143581 A1 | 7/2004 | Bohannon et al. | |
| 2004/0148278 A1 | 7/2004 | Milo et al. | |
| 2004/0167864 A1 | 8/2004 | Wang et al. | |
| 2004/0167904 A1 | 8/2004 | Wen et al. | |
| 2004/0193575 A1 | 9/2004 | Chen et al. | |
| 2004/0205551 A1 | 10/2004 | Santos | |
| 2004/0215600 A1 | 10/2004 | Aridor et al. | |
| 2004/0221226 A1 | 11/2004 | Lin et al. | |
| 2004/0260691 A1 | 12/2004 | Desai et al. | |
| 2004/0267760 A1 | 12/2004 | Brundage et al. | |
| 2005/0004892 A1 | 1/2005 | Brundage et al. | |
| 2005/0022115 A1 | 1/2005 | Baumgartner et al. | |
| 2005/0038688 A1 | 2/2005 | Collins et al. | |
| 2005/0050016 A1 | 3/2005 | Stanoi et al. | |
| 2005/0091188 A1 | 4/2005 | Pal et al. | |
| 2005/0102256 A1 | 5/2005 | Bordawekar et al. | |
| 2005/0114314 A1 | 5/2005 | Fan et al. | |
| 2005/0120031 A1 | 6/2005 | Ishii | |
| 2005/0160076 A1 | 7/2005 | Kanemasa | |
| 2005/0160108 A1 | 7/2005 | Charlet et al. | |
| 2005/0228792 A1 | 10/2005 | Chandrasekaran et al. | |
| 2005/0228818 A1 | 10/2005 | Murthy et al. | |
| 2005/0229158 A1 | 10/2005 | Thusoo et al. | |
| 2005/0257201 A1 | 11/2005 | Rose et al. | |
| 2005/0289125 A1 | 12/2005 | Liu et al. | |
| 2005/0289138 A1 | 12/2005 | Cheng et al. | |
| 2007/0005632 A1 | 1/2007 | Stefani et al. | |

FOREIGN PATENT DOCUMENTS

| | | |
|---|---|---|
| WO | WO 01/59602 A1 | 8/2001 |
| WO | WO 01/61566 | 8/2001 |
| WO | WO 03/027908 A2 | 4/2003 |

OTHER PUBLICATIONS

Current Claims, PCT/US2005/021259, 15 pages.

Choi, Byron et al., "The XQuey Formal Semantics: A Foundation for Implementation Optimization," May 31, 2002, IEEE XP-002353605, 15 pages.

Funderbunk, J. et al., "XML programming with SQL/XML and XQuery", IBM Systems Journal, XP-002295973 (2002), pp. 642-665.

Kang, Ji-Hoon et al., "An XQuery Engine for Digital Library Systems that support XML data," Proceedings of the 2004 International Symposium on Application and the Internet Workshops, IEEE XP-0010684128, 5 pages.

Murthy, Ravi et al., "XML Schemas in Oracle XML DB," Proceedings of the 29th VLDB Conference, 2003, IEEE XP-002353604, pp. 1009-1018.

Shanmugasundaram, Jayavel, et al., "Querying XML Views of Relational Data," Proceedings of the 27th Very Large Databases Conference, Rome, Italy, Sep. 2001, pp. 261-270.

Zhang, Hui et al., "XQuery rewriting at the relational algebra level," Computer Systems Science and Engineering, vol. 18, No. 5, Sep. 2003, IEEE XP-009056809, pp. 241-262.

Zhang, Xin et al., "Honey, I Shrunk the XQuery!—An XML Algebra Optimization Approach," Submission for WIDM'02, IEEE XP-002316448, 14 pages.

Braga, Daniele et al., "A Graphical Environment to Query XML Data with Query," Proceedings of the Fourth International Conference on Web Information Systems Engineering (WISE '03), 2003, IEEE, 10 pages.

Chae, Mi-Ok et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Cheng, Josephine et al., "IBM DB2 XML Extender," IEEE, ICDE '00 Conference, San Diego, Feb. 2000, 128 pages.

(56) References Cited

OTHER PUBLICATIONS

Cooper, Brian F. et al., "A Fast Index for Semistructured Data," Proceeding of the International Conference on Very Large Databases, 2001, XP-002303292, pp. 341-350.
Diao, Y. et al., "Path Sharing and Predicate Evaluation for High-Performance XML Filtering" XP-002344354 *ACM Transactions on Database Systems* (2003), pp. 467-516.
Diao, Y. et al., "YFilter: Efficient and Scalable Filtering of XML Documents" *IEEE* (2002) 2 pages.
Helmer, S. et al., "Optimized Translations of XPath into Algebraic Expressions Parameterized by Programs Containing Navigational Primitives" *IEEE* (2002) 10 pages.
Kudrass, Thomas, "Management of XML Documents Without Schema in Relational Database Systems," Information and Software Technology, vol. 44, No. 4, Mar. 31, 2002, XP-004347776, pp. 269-275.
Lo et al., "XAS: A System for Accessing Componentized, Virtual XML Documents," IEEE, 2001, pp. 493-502.
Mchugh, Jason, et al. "Indexing Semistructured Data," Stanford Science Department, 1998, XP-002248313, pp. 1-21.
McHugh; Jason et al., "Query Optimization for XML", XP-002333353, *Proceedings of the 25th VLDB Conference* (1999) pp. 315-326.
Myllymaki, Jussi, "Effective Wed data Extraction with Standard XML Technologies," WWW10, May 1-5, 2001, pp. 689-696.
Noser, Hansrudi et al., "Dynamic 3D Visualization of Database-Defined Tree Structures on the WWW by Using Rewriting Systems," 2000, IEEE, XP-002262516, pp. 247-254.
Schmidt et al., "Why and How to Benchmark XML Databases," SIGMOND Record, vol. 3, No. 3, Sep. 2001, pp. 27-32.
Vorthmann, S. et al. "Beyond Schemas, Schema Adjuncts and the Outside World," Markup Languages, Online!, vol. 2, No. 3, Jun. 2000, pp. 1-8.
Yoshikawa, Masatoshi et al., "XRel: A Path-Based Approach to Storage and Retrieval of XML Documents Using Relational Databases", XP-001143686, *ACM Transactions on Internet Technology* (2001), pp. 110-141.
Zhang, Wansong, et al., "An Encoding Scheme for Indexing XML Data," E-Commerce and E-Service, 2004, XP-010697639, pp. 526-529.
Zisman et al., "Using XML to Build Consistency Rules for Distributed Specifications," Proceedings of the Tenth International Workshop on Software Specification and Design (IWSD'00), IEEE 2000, 8 pages.
International Searching Authority, "Notification of the Transmittal of the International Search Report and the Written Opinion of the International Searching Authority, or the Declaration," PCT/US2005/020795, Mailing Date Sep. 27, 2005, 13 pages.
Current Claims, PCT/US2005/020795, 5 pages.
International Searching Authority, "Notification of Transmittal of the International Search Report and the Written Opinion of the International Searching Authority, or the Declaration," PCT/US2005/011763, dated Aug. 1, 2005, 12 pages.
Current Claims, PCT/US2005/011763, 5 pages.
Notification of Transmittal of the International Search Report and the Written Opinion of the International Searching Authority, or the Declaration for pending international application No. PCT/US2005/020802.
Pending claims for pending international application No. PCT/US2005/020802.
Notification of Transmittal of the International Search Report and the Written Opinion of the International Searching Authority, or the Declaration received from International application No. PCT/US2005/011762.
Pending claims from International application No. PCT/US2005/011762.
European Patent Office, "Communication Pursuant to Article 96(2) EPC," EP App. No. 02799692.5, dated Jan. 18, 2005, 5 pages.
Current Claims PCT/US02/31168, EP App. No. 02799692.5, 8 pages.
International Preliminary Examining Authority, "Notification of Transmittal of the International Preliminary Report on Patentability," PCT/US2005/021259, dated Feb. 2, 2007, 9 pages.
Claims, PCT/US2005/021259, dated Nov. 30, 2006, 8 pages (attached).
Rys, Michael et al., "Integrating XQuery and Relational Database Systems," Chapter 7—*XQuery from the Experts: A Guide to the W3C XML Query Language*, Addison Wesley Professional, Aug. 22, 2003, ISBN 978-0-321-18060-5, pp. 353-391.
MacKenzie, David et al., "Finding Files", GNU Findutils Version 4.1.2, Nov. 1994, 38 pages.
Katz, Howard et al., "Integrating XQuery and Relational Database Systems," Chapter 7—*XQuery from the Experts: A Guide to the W3C XML Query Language*, Addison Wesley Professional, Aug. 22, 2003, ISBM 978-0-321-18060-5, pp. 353-391.
Zemke, Fred, "XMLQuery," Change Proposal, ISO/IEC JTC1/SC32 WG3:SIA-nnn ANSI NCITS H2-2004-02lrl, Mar. 14, 2004, 29 pages.
International Preli Minary Examining Authority, "Written Opinion," PCT/US2005/021259, dated Oct. 13, 2006, 7 pages.
Current Claims, PCT/US2005/021259, 10 pages.
Girardot et al., "Millau: an encoding format for efficient representation and exchange of XML over the Web", IBM Almaden Research Center, 24 pages.
Shankar Pal et al., "Indexing XML Data Stored in a Relational Database", Proceedings of the 30th VLDB Conference, 2004, 12 pages.
Mackenzie et al., "Finding Files", FindUtils, Version 4.1.2, Source Code, GNU.org, Nov. 1997, source files, code. C, 22 pages.
Cormen et al., "Introduction to Algorithms", MIT Press, 2001, 2nd Edition, 4 pages.
European Patent Office, "Communication pursuant to Article 94 (3) EPC", European patent application 05732473.3-1225, dated Feb. 4, 2008, 7 pages.
State Intellectual Property Office of P.R.C., "Notification of the First Office Action", European patent application 2005800186273.9, dated Oct. 12, 2007, 9 pages.
Claims, European patent application 2005800186273.9, 3 pages.
Claims, European patent application 05732473.3-1225, 3 pages.
U.S. Appl. No. 11/784,341, filed Apr. 5, 2007, Notice of Allowance, Jun. 17, 2010.
Tirthankar Lahiri et al., 50,000 Users on an Oracle8 Universal Server Database, 1998, ACM, pp. 528-530.
Benoit Dageville et al., SQL Memory Management in Oracle9i, Aug. 2002, ACM, pp. 962-973.

\* cited by examiner

MECHANISM FOR EFFICIENT MAINTENANCE OF XML INDEX STRUCTURES IN A DATABASE SYSTEM

PRIORITY CLAIM

This application is related to U.S. patent application Ser. No. 10/884,311, entitled INDEX FOR ACCESSING XML DATA, filed by Sivasankaran Chandrasekaran, Ravi Murthy, Ashish Thusoo, Anh Tuan Tran, Sreedhar Mukkamalla, Eric Sedlar, and Nipun Agarwal on Jul. 2, 2004, the contents of which are herein incorporated by reference in their entirety for all purposes.

This application is related to U.S. patent application Ser. No. 10/944,171, entitled MECHANISM FOR EFFICIENTLY EVALUATING OPERATOR TREES, filed by Ashish Thusoo, Ravi Murthy, Sivasankaran Chandrasekar, Eric Sedlar, and Nipun Agarwal on Sep. 16, 2004, the contents of which are herein incorporated by reference in their entirety for all purposes.

This application is related to U.S. patent application Ser. No. 10/944,177, entitled INDEX MAINTENANCE FOR OPERATIONS INVOLVING INDEXED XML DATA, filed by Ravi Murthy, Sivasankaran Chandrasekar, Ashish Thusoo, Nipun Agarwal, and Eric Sedlar on Sep. 16, 2004, the contents of which are herein incorporated by reference in their entirety for all purposes.

This application is related to U.S. Patent Application Ser. No. 60/599,319, entitled EFFICIENT EVALUATION OF QUERIES USING TRANSLATION, filed by Zhen Hua Liu, Muralidhar Krishnaprasad, Anand Manikutty, James W. Warner, Hui X. Zhang, Vikas Arora and Susan M. Kotsovolos on Aug. 6, 2004, the contents of which are herein incorporated by reference in their entirety for all purposes.

This application is related to U.S. Patent Application Ser. No. 60/599,652, entitled PROCESSING QUERIES AGAINST ONE OR MORE MARKUP LANGUAGE SOURCES, filed by Zhen Hua Liu, Muralidhar Krishnaprasad, Anand Manikutty, James W. Warner, Hui X. Zhang, Vikas Arora, Susan M. Kotsovolos, Ying Lu, Karuna Muthiah and Qin Yu on Aug. 6, 2004, the contents of which are herein incorporated by reference in their entirety for all purposes.

This application is related to U.S. patent application Ser. No. 10/948,523, entitled EFFICIENT EVALUATION OF QUERIES USING TRANSLATION, filed by Zhen Hua Liu, Muralidhar Krishnaprasad, Anand Manikutty, James W. Warner, Hui X. Zhang, Vikas Arora and Susan M. Kotsovolos on Sep. 22, 2004, the contents of which are herein incorporated by reference in their entirety for all purposes.

FIELD OF THE INVENTION

The present invention relates generally to XML indexes and more specifically to efficiently maintaining one or more XML index structures in a database system.

BACKGROUND

XML (i.e. eXtensible Markup Language) is becoming the standard format for representing semi-structured data which are then stored and managed within database systems. All the major database systems are being extended to natively support XML data. Standard query languages such as XPath and XQuery are typically used to query these document collections. Specialized index structures, such as an XML index, have been developed to improve the performance of query operations. An XML index stores entries corresponding to all the nodes of a set of indexed XML documents. Each entry tracks information about the corresponding node, such as the path to the node, the value of the node (if the node is a leaf node) and some information about the hierarchical position of the node (such as a dewey style order key). Additional secondary indexes may also be created to improve lookup of entries based on path, value, etc.

However, creating an XML index adds significant overhead to the cost of inserting and updating documents within the system. When a new document is inserted, or an existing document is updated, entries corresponding to all the affected nodes of the document need to be generated and inserted into the index structure. In the case of an update operation, all the entries corresponding to the nodes of the old document need to be deleted and entries corresponding to the nodes of the updated document need to be added. Further, any secondary indexes need to be suitably updated.

To ensure that the index contains accurate information, changes made to the index and any secondary indexes are performed in the same atomic transaction as the change to the underlying data. In other words, the index and the underlying data are maintained synchronously. These index maintenance operations could result in a significant slowdown of the overall insert/update operation. This problem is especially critical for high-throughput and low latency requirements of On-Line Transaction Processing (OLTP) applications.

This presents a significant dilemma. On the one hand, although significant overhead is incurred, the index must be updated in order to be useful. On the other hand, simply eliminating the index is not suitable because doing so would severely degrade query performance.

Based on the foregoing, there is a clear need to provide a mechanism for retaining the benefits of an XML index without incurring significant overhead during inserts and updates of documents.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
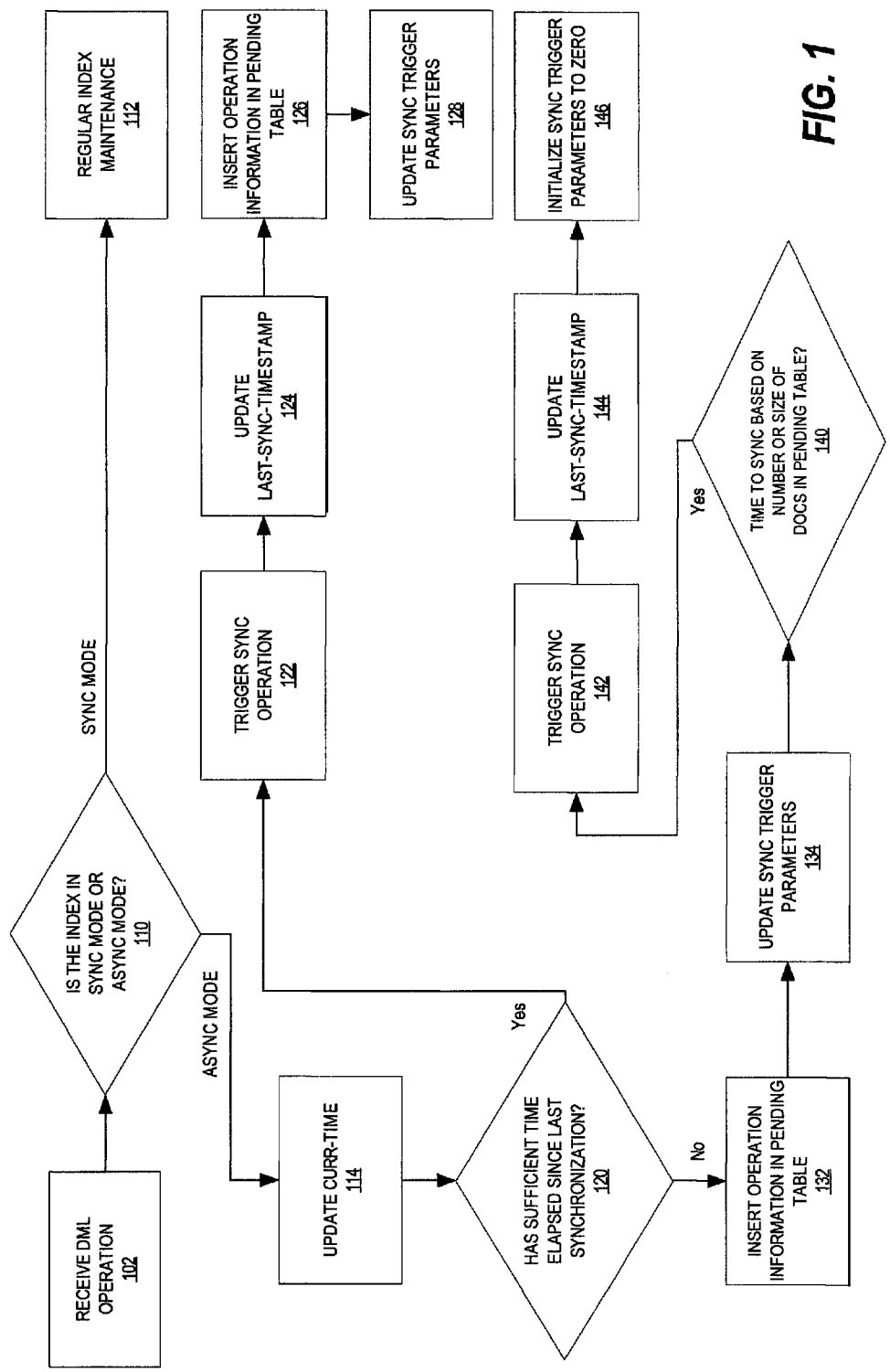
FIG. 1 is a flow diagram that illustrates the steps a computer system will perform when a DML operation is issued, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for efficiently maintaining an XML index in a database system. Query performance benefits of an XML index were previously available only at the cost of significant performance degradation of DML operations, such as insert, delete, and update. The techniques for efficiently maintaining an XML index described herein have the distinct advantage in that they offer the query benefits of the XML index with the possibility of avoiding the associated index maintenance costs during DML operations. DML operations are now able to proceed with very little added overhead in the presence of an XML index. However, the query performance benefits are still available to applications.

Instead of immediately updating the index when a change to a document is submitted, the update is stored in a separate PENDING table that is used to update the index at another time. The timing of the update to the index may be, for example, based on the lapse of a specified period of time, the size of all documents affected by a change in the PENDING table, and/or the number of documents affected by a change in the PENDING table.

A mechanism is provided to allow the index to be in synchronous or asynchronous mode. These modes shall be described in greater detail hereafter.

In addition, the user may specify if the query requires "current" results, or if "stale" results are sufficient. With the "stale" mode, the queries offer highest performance but the results reflect an earlier state of the database. The stale mode of operation is best for applications that have tolerance for time lag, such as some DSS (Decision Support System) queries.

In "current" mode, the current results are returned while incurring a slight performance overhead due to 1) filtering results from the index based on the PENDING table and 2) functional processing of the PENDING table. The different modes are discussed below.

The techniques described herein are applicable to all systems that store and manage XML document collections. In particular, it is applicable to all database systems that can support XML data such as native XML databases and extended relational DBMS.

Async Mode

The async mode is a mode in which the XML index entries are maintained asynchronously. The async mode of index maintenance is in contrast to the conventional technique of synchronous maintenance of indexes. In synchronous maintenance, the statement inserting a document returns back to a user only after the document is inserted successfully and the one or more indexes on the document have been fully updated. In the async mode, the DML statement immediately returns back to the user without any modification to the indexes. The identifier (ID) of the affected document (for example, the ROWID or document-ID) along with the corresponding operation code (opcode) for insert, delete, or update is logged in a separate PENDING table.

While in async mode, the index becomes out of sync with the underlying documents. The index may be synchronized (i.e. updated with all pending changes) either explicitly via an SQL DDL statement or automatically. Automatic synchronization is based on certain criteria, such as the elapsed time since the last sync operation, the number of documents in the PENDING table, the total size of the affected documents in the PENDING table, or some combination of these or other parameters.

Async-Stale Mode

Async-stale mode indicates that the query results can be stale; meaning the query results can reflect the document collection as of some previous point in time. Specifically, the query results are based off the state of the document collection at the time of the last index synchronization. This mode offers the highest performance since the index does not have to be updated concurrently with each update operation and the PENDING table does not have to be examined before returning the indexed information.

Async-Curr Mode

Asynchronous-current (async-curr) mode indicates that although the XML index is being maintained asynchronously, any queries using the XML index should always return the current results; meaning the query results should reflect the current state of the document collection. Thus, documents that have been newly inserted, but not yet indexed, should appear in the query results if they match the query criteria. Similarly, documents that have been recently deleted, but are still present in the index, should not appear in any query results. Also, recently updated documents should be returned reflecting their new content. In order to return current query results, the PENDING table must be examined.

Pending Table

The PENDING table is created when the async mode is specified. The PENDING table consists of at least two columns: opcode number and document-ID. The opcode number indicates the operation being performed. For instance, "1" in the opcode column indicates an insertion, "2" indicates a deletion, and "3" indicates an update. The document-ID field is the identifier of the document affected by a particular operation.

Synchronization Parameters

As stated previously, in order for the index to be useful, the index must ultimately be updated. Thus, a user, such as a database administrator, can specify certain criteria that must be satisfied in order to trigger an update to the index. In one embodiment of the invention, the following parameters are specified during index creation and are stored along with the index metadata: time-window-to-sync, num-pending-docs-to-sync, and pending-docs-size-to-sync.

The parameter time-window-to-sync specifies the number of seconds that should transpire since the last sync operation before another sync operation should be triggered. The parameter num-pending-docs-to-sync is the number of pending documents in the PENDING table at which point a sync operation is triggered. The parameter pending-docs-size-to-sync specifies the total size of all pending documents in the PENDING table at which point a sync operation is triggered. When more than one of the above parameters is specified, the index is synchronized as soon as any one of the parameters is satisfied. In alternate embodiments, synchronization occurs only when all specified parameters are satisfied.

There are many other ways in which a sync operation may be initiated. A user may choose to specify that any combination of the three parameters must be satisfied before a sync operation is performed. Also, other parameters may be specified that would trigger a sync operation, such as the number of changes to a given secondary index or a given document. Another trigger could be resource utilization, wherein the index is synchronized when the activity within the database is below a certain threshold. Lastly, a user may initiate a sync operation explicitly and unilaterally with an SQL DDL statement.

Sync Operation

Once a sync operation is triggered, the database system must update the index, and secondary indexes if secondary indexes are involved, to reflect the changes made to the documents. The following is pseudo code of what steps a sync operation performs, according to an embodiment of the invention.

```
disable secondary indexes on xml index table
for all the documents in PENDING table do
    if opcode = delete then
        delete index entries corresponding to the document
    else if opcode = insert then
        generate and insert index entries corresponding the document
    else // update case
        delete index entries corresponding to document
        generate and insert index entries corresponding to document
enable secondary indexes on xml index table
truncate PENDING table
```

First, the secondary indexes are disabled before a sync operation. During the sync operation, the XML index is generally disabled, i.e. not available, because it may change index data over multiple transactions—but the index should not be used until all the changes have been made. For each document in the PENDING table, the opcode is read to determine which DML operation is to be performed. If the opcode indicates a deletion, then all the index entries corresponding to the document are deleted. If the opcode indicates an insertion, then new index entries, corresponding to the document, are generated and inserted into the index. If the opcode indicates neither a deletion nor an insertion, then the operation must have been an update, which is treated as a deletion followed by an immediate insertion.

When the indexes have been synchronized, the secondary indexes are re-enabled and the pending changes in the PENDING table are deleted. Note that because synchronization occurs as an independent operation, synchronization has no impact on the performance of the DML operations that originally made the changes to the indexed documents.

Automatic Index Synchronization

In one embodiment, whenever a DML operation is issued, the database system will determine whether the index is in async mode or in sync mode. If the index is in async mode, then the system may check whether any parameters, such as the ones discussed previously, have been satisfied. FIG. 1 and the following pseudo code illustrate the steps a database system will perform whenever a DML operation is issued (step 102), according to an embodiment of the invention.

```
if (index is set to async mode) {
    update curr-time;
    if (curr-time − last-sync-timestamp > time-window-to-sync) {
```

-continued

```
        trigger sync operation (via a queue mechanism - so this
        operation will
            not be affected);
        update last-sync-timestamp;
        insert (opcode, document-ID) into PENDING table;
        update num-pending-docs;
        update size-pending-docs;
    }
    else { // specified time between sync operations has not elapsed
        insert (opcode, document-ID) into PENDING table;
        update num-pending-docs;
        update size-pending-docs;
        if (num-pending-docs > num-pending-docs-to-sync) or
            (size-pending-docs > pending-docs-size-to-sync) {
            trigger sync operation;
            update last-sync-timestamp;
            num-pending-docs = 0; // initialize variables to 0
            after sync op
            size-pending-docs = 0;
        }
    }
}
else {
    regular synchronous index maintenance;
}
```

The logic above determines whether the index is in async mode (step 110). If not, then regular synchronous activity is performed (step 112). If the index is in async mode, then a variable curr-time is updated (step 114) and then compared to the last time a sync operation was performed (step 120). If the elapsed time is greater than the time-window-to-sync, then the index is synchronized (step 122). After synchronization, the last-sync-timestamp is updated (step 124), an entry is inserted in an empty PENDING table (step 126), and sync trigger parameters such as num-pending-docs and size-pending-docs are updated (step 128). Otherwise, no sync operation is performed and an entry is inserted into the PENDING table (step 132).

After the insertion, variable num-pending-docs is incremented and variable size-pending-docs is updated (step 134). Both variables are compared to their respective sync-time operation variables (num-pending-docs-to-sync and pending-docs-size-to-sync) to determine whether an automatic sync operation should be performed (step 140).

When the index is synchronized (step 142) based on the determination made in step 140, the variable last-sync-timestamp is updated (step 144) and the variables num-pending-docs size-pending-docs are reinitialized to zero (step 146), indicating that the PENDING table is empty following synchronization.

Query Example

When a query with XPath or XQuery statement is submitted against the indexed document collection, certain parts of the query, such as those involving path traversals (child and descendant axis) and predicates, can be handled by the XML index. A query against the XML index table is generated and executed. The query against the index table returns a set of matching document identifiers and node identifiers. These are fed back to the original SQL execution tree for further processing.

For example, the query below selects all purchase order XML documents which have an element <Total> with a value greater than 1000.

select pocol
    from potab where existsNode(pocol, '/PurchaseOrder[Total>1000]');
A query is generated and executed against the XML index table such as follows.

select p1.docid
    from xmlidxtab p1, xmlidxtab p2
    where p1.pathid='/PurchaseOrder'
    and p1.docid=p2.docid
    and p1.orderkey=sys_orderkey_parent(p2.orderkey)
    and p2.pathid='/PurchaseOrder/Total'
    and p2.value>1000;

The above query returns the document identifiers of all purchase orders satisfying the XPath condition. The document identifiers are plugged back into the original SQL query, which could involve complex joins, aggregates, etc. involving other tables.

In case of fragment extraction, a locator could be returned from the XML index. The locator is then used to access the XML LOB (i.e. large object) in the base table at a specified offset location. More details about how a locator may be used to access LOBs may be found in U.S. patent application Ser. No. 10/884,311, entitled INDEX FOR ACCESSING XML DATA, filed on Jul. 2, 2004.

Querying in Async-Stale Mode

If the query is executed in async-stale mode, then the SQL query is run against the index table in manner similar to the usual case (where the index and documents are maintained synchronously). However, locators to the base table are accessed using the snapshot of the last sync operation of the index. Thus, although the accessed information from the query may be old, all the information in the index and document collection are consistent with each other and reflect the time of the last synchronization.

Querying in Async-Curr Mode

If a query is executed in async-curr mode, then the query processing involves an additional intermediate step between the step of querying against the index table and the step of returning the results to the original SQL query. Specifically, the intermediate step filters the results to eliminate the index entries corresponding to deleted and updated documents in the PENDING table. Further, the intermediate step evaluates the query and checks for matching results corresponding to the inserted and updated documents from the PENDING table.

For example, the following illustrates pseudo code for handling a query against a database when the index is in async-curr mode. Original query Q is queried against the base table and a generated query GQ is queried against the index table.

```
...
execute GQ;
for each result returned from GQ
    if doc_id exists in PENDING table AND opcode is 'delete' or 'update'
        skip this result;
    else return result to Q;
    [// handle pending inserts and updates]
for all documents in PENDING table with opcode = 'insert' or 'update'
    evaluate the XPath using functional evaluation;
    if matching results obtained,
        return result to Q;
...
```

Thus, for a query against the index table, a particular result is compared to the results in the PENDING table. If the particular result pertains to a particular document and the operation performed on the document was a delete or update, then the particular result obtained using the index is not returned. Otherwise, the particular result is returned.

Furthermore, regardless of whether the particular result is returned, the PENDING table must be examined to determine if there is a pending insert or update that is relevant to query GQ. Therefore, the XPath query is evaluated against each entry in the PENDING table that is an insert or update operation. If any of the inserts and updates have made changes that would satisfy the XPath query, then those results are returned as well.

Figure 2:
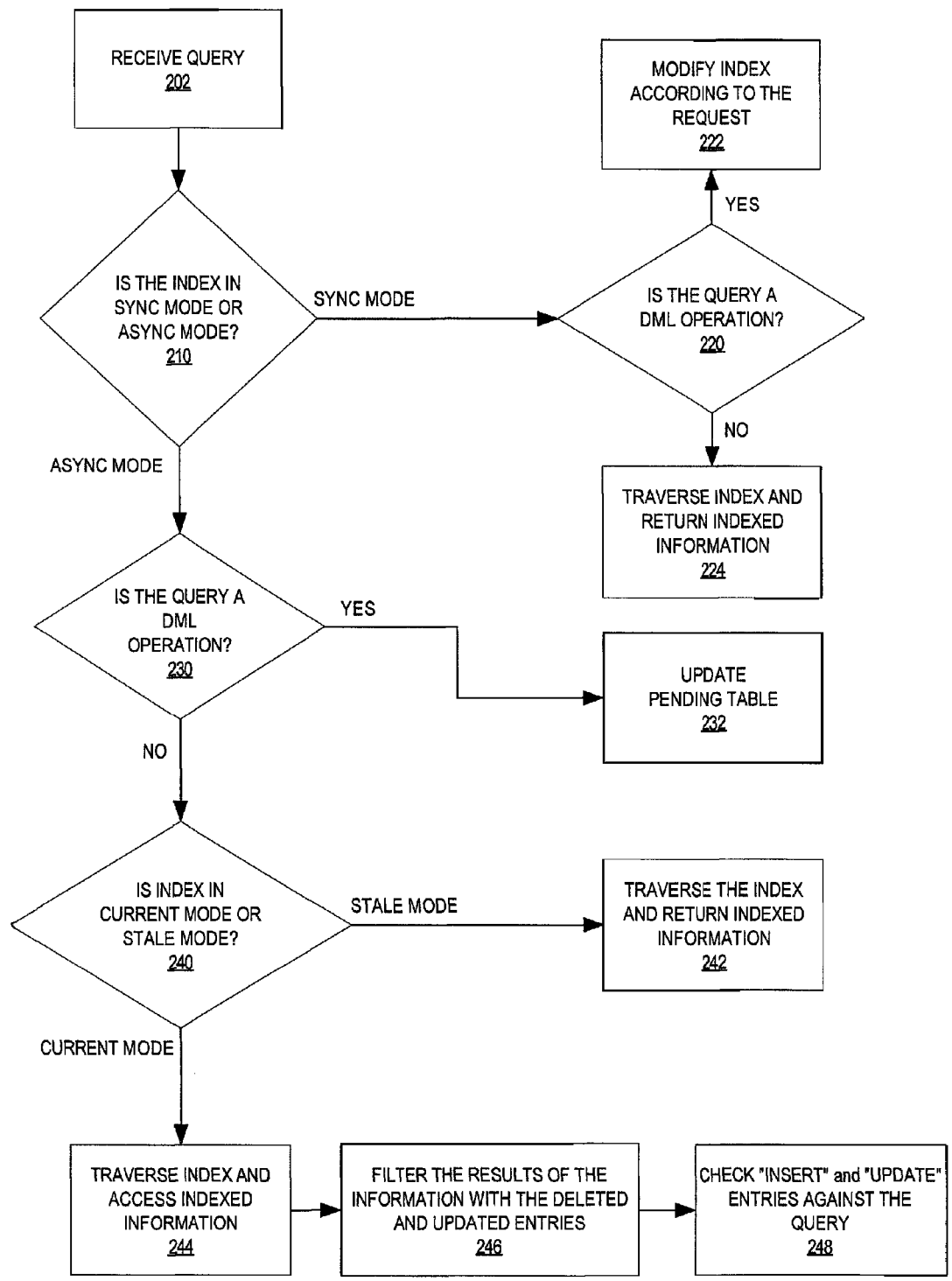
FIG. 2 is a flow diagram that illustrates how a query is processed, depending on the state of an index, according to an embodiment of the invention.

FIG. 2 is a flowchart that illustrates how a query is processed, according to one embodiment of the invention. In step 202, a query is received, for example from a user. A query is processed differently depending on whether the index is in sync mode or async mode. In step 204, it is determined in which mode the index is currently running. If the index is being maintained synchronously with XML documents, then in step 220 it is determined whether the query is a DML operation (e.g., insert, update, delete) or another query, such as a lookup, which does not affect the indexed information. If the query is not a DML operation, then execution proceeds to step 224 where the index is traversed and the indexed information that satisfies the query is returned to the process or user that initially submitted the query. If the query is a DML operation, then execution proceeds to step 222 where the index and the affected XML document(s) are synchronously modified, based on the DML operation.

If, in step 210, it is determined that the index is maintained in async mode, then another decision is made at step 230 of whether the query is a DML operation. If the query is a DML operation, then execution proceeds to step 232 where the PENDING table is updated according to the DML operation. However, if the query is not a DML operation, then a determination is made at step 240 of whether the index is maintained in async-curr mode or async-stale mode.

According to one embodiment, an index that is maintained asynchronously may always be in current mode. Thus, upon the determination that the query was not a DML operation in step 230, execution would proceed directly to step 244.

If, at step 240, the index is in stale mode, then execution proceeds to step 242 where the index is traversed and the indexed information that satisfies the query is returned to the process or user that initially submitted the query. If the index is maintained in current mode, then execution proceeds to step 244 where the index is traversed and the indexed information is accessed for further processing. The indexed information, at step 246, is filtered with the entries in the PENDING table to determine if the indexed information has been deleted or updated since the last synchronization. Then, at step 248, the PENDING table is scanned for insert and updated entries that satisfy the initial query. Any results that remain after filtering at step 246 and that are obtained from executing step 248 are returned to the process or user that initially submitted the query.

Granularity

When a query is submitted, the indications in each entry in the PENDING table as to which documents were modified by DML operations may be too inclusive. In other words, although a document was indeed modified, a certain node or subtree within the document may not have been modified. Thus, the index may still be current as far as the node or subtree is concerned. But if the PENDING table only indicated that the document as a whole was modified, then the results returned from the index would have to be ignored. Under these conditions, the index is not being used to its fullest extent possible. In this non-optimal state of operation the PENDING table is utilized at document-level granularity.

Thus, in another embodiment of the invention, the PENDING table is operated at the node and subtree level of granularity. The PENDING table includes indications as to which node or subtree is modified by a DML operation. Thus, the PENDING table does not indicate that an entire document was necessarily updated, but rather only a single node, for example, was updated.

In order to track changes to the index at the node and subtree level, an order key value is stored along with the document-ID and opcode number. Accordingly, when a result is returned from a query against the index, the order key of the result is compared with the entries indicating a delete or update in order to see if the delete or update is going to affect the result. For example, a result obtained from the index pertains to a subtree in a particular document and an entry in the PENDING table indicates that the same document was updated. However, the order key of the entry associated with the updated document indicates that the update pertains to a different subtree. Thus, the result from the index is returned.

Updating Certain Secondary Indexes

According to one embodiment, a logical XML index includes a path table, and a set of secondary indexes. The PATH table includes the information required to locate the XML documents, or XML fragments, that satisfy a wide range of queries. However, without secondary access structures, using the PATH table to satisfy such queries will often require full scans of the PATH table. Therefore, a variety of secondary indexes are created by the database server to accelerate the queries that (1) perform path lookups and/or (2) identify order-based relationships. According to one embodiment, the following secondary indexes are created on the PATH table.

PATHID_INDEX on (pathid, rid)
ORDERKEY_INDEX on (rid, order_key)
VALUE indexes
PARENT_ORDERKEY_INDEX on (rid, SYS_DEWEY_PARENT (order_key))

In such an embodiment, some secondary indexes may be utilized and modified considerably more often than the other secondary indexes. For example, the PATHID_INDEX may be utilized much more frequently than the VALUE indexes at a given time. It may be more efficient then to synchronize just the PATHID_INDEX to keep that index current without incurring the overhead cost of constantly calling the sync operation on the VALUE indexes when they do not need to be synchronized. Therefore, in another embodiment, synchronization of a subset of secondary indexes can be initiated explicitly via an SQL DDL statement or automatically based on certain parameters similar to the ones described above. In order to enable a subset of all indexes to be synchronized without synchronizing another subset of the same indexes, either each secondary index would have to be associated with its own PENDING table or a single PENDING table would have to include another field that indicated which secondary index is affected by a DML operation.

Hardware Overview

Figure 3:
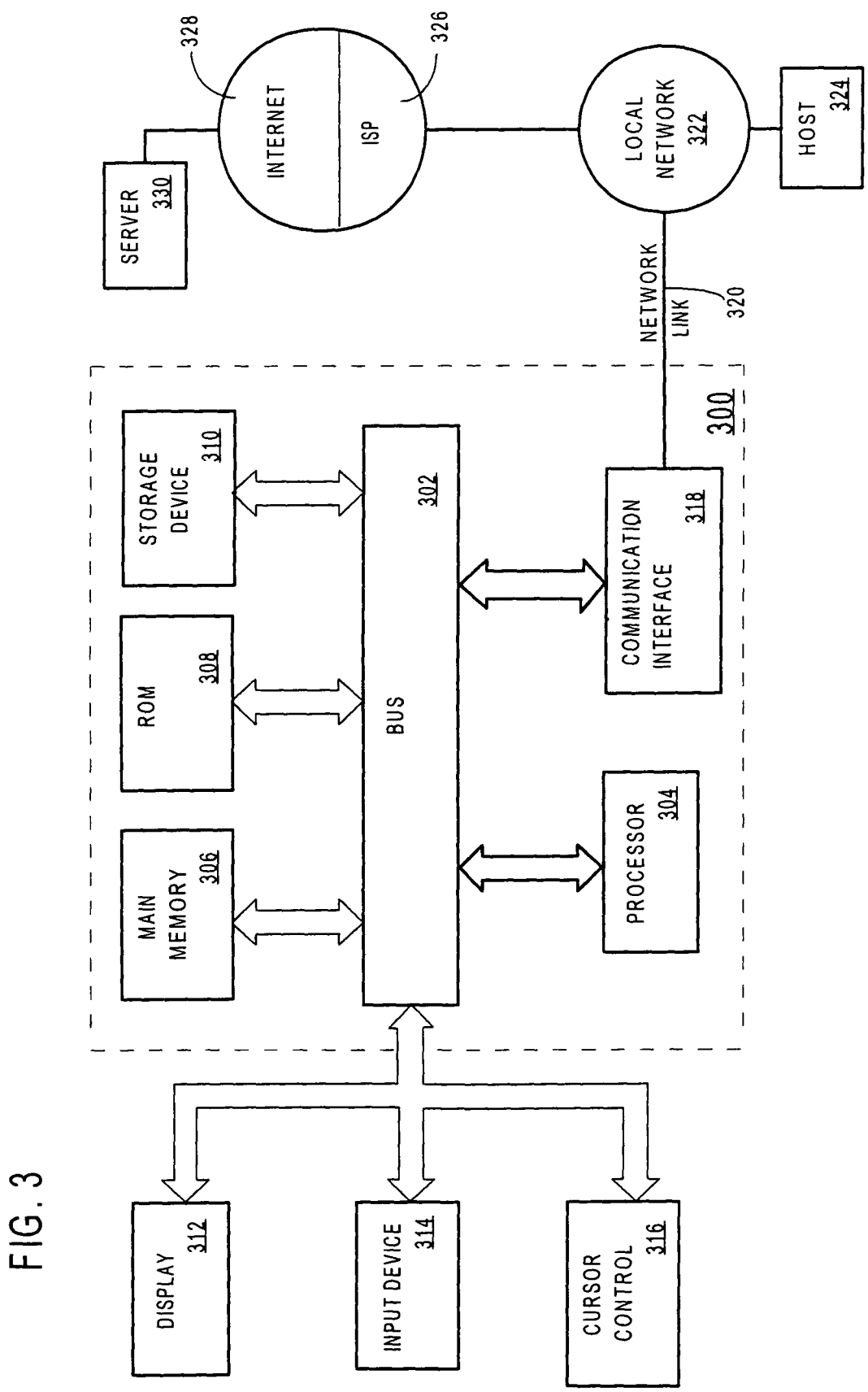
FIG. 3 is a block diagram of a system upon which the techniques described herein may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 230 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 230 typically provides data communication through one or more networks to other data devices. For example, network link 230 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 230 and through communication interface 318, which carry the digital data to and from computer system 300, are exemplary forms of carrier waves transporting the information.

Computer system 300 can send messages and receive data, including program code, through the network(s), network link 230 and communication interface 318. In the Internet example, a server 230 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   when changes are made to indexed information, storing one or more indications that an index has to be changed, wherein the step of storing one or more indications is performed in a first operation that is synchronous relative to the changes, wherein the index is not changed during said first operation;
   in response to detecting that certain conditions have been satisfied, performing a second operation that updates the index and removes the one or more indications that the index has to be changed, wherein the second operation is performed asynchronously relative to the changes made to the indexed information; and
   after the first operation has been completed and before the second operation is performed:
      receiving a request to access the indexed information; and
      in response to receiving the request:
         obtaining accessed information by using the index to access the indexed information even though the changes are not yet reflected in the index;
         reading data to determine whether the index is maintained in asynchronous stale mode or in asynchronous current mode;
         if the index is maintained in asynchronous stale mode, then using the index to return the accessed information; and
         if the index is maintained in asynchronous current mode, then:
            determining, from the one or more indications, whether any portion of the accessed information has been deleted or updated,
            if a portion of the accessed information has been deleted or updated, responding to the request after removing said portion of the accessed information from the accessed information; and
            examining the one or more indications for inserted and updated information that relates to the request.

2. The method as in claim 1, wherein said certain conditions are satisfied by a user providing user input that specifies that the index is to be updated to reflect the changes.

3. The method as in claim 1, wherein the indexed information is XML.

4. The method as in claim 1, wherein:
   a pending table stores the indications,
   the indexed information is information in one or more documents, and
   the certain conditions include at least one of:
      the size of all documents, corresponding to pending changes stored in the pending table, exceeds a specified size, or
      resource utilization has reached a specified level.

5. The method as in claim 1, wherein each indication is associated with:
   an opcode number, which identifies an operation being performed; and
   a document identifier, which identifies a document affected by the operation.

6. The method as in claim 5, wherein each indication is also associated with an order key value, which identifies a particular node or subtree in the document affected by the operation.

7. The method as in claim 1, wherein the second operation comprises the steps of:
   disabling the index and any secondary indexes,
   for each indication, if the operation associated with the indication is a deletion, deleting the index entries corresponding to the indication;
if the operation associated with the indication is an insertion, generating and inserting index entries corresponding to the indication; and
if the operation associated with the indication is an update, deleting the index entries corresponding to the indication, and generating and inserting index entries corresponding to the indication;
enabling the index and any secondary indexes; and
deleting all indications.

8. The method as in claim 1, further comprising storing data that indicates whether the index is to be maintained asynchronously or synchronously, wherein if the data is changed to indicate that the index is to be maintained synchronously, then changes made to the indexed information during a subsequent operation causes the index to be changed during the subsequent operation.

9. The method as in claim 1, further comprising, in response to user input, storing data that indicates whether the index is to be maintained in asynchronous stale mode or asynchronous current mode.

10. The method as in claim 1, wherein:
the index is one of a plurality of related indexes;
the plurality of related indexes include the index and one or more secondary indexes; and
a subset of the plurality of related indexes is synchronized more frequently than a different subset of the plurality of related indexes based on a second set of certain conditions.

11. One or more non-transitory machine-readable media storing instructions which, when executed by one or more processors, cause:
when changes are made to indexed information, storing one or more indications that an index has to be changed, wherein the step of storing one or more indications is performed in a first operation that is synchronous relative to the changes, wherein the index is not changed during said first operation;
in response to detecting that certain conditions have been satisfied, performing a second operation that updates the index and removes the one or more indications that the index has to be changed, wherein the second operation is performed asynchronously relative to the changes made to the indexed information; and
after the first operation has been completed and before the second operation is performed:
receiving a request to access the indexed information; and in response to receiving the request:
obtaining accessed information by using the index to access the indexed information even though the changes are not yet reflected in the index;
reading data to determine whether the index is maintained in asynchronous stale mode or in asynchronous current mode;
if the index is maintained in asynchronous stale mode, then using the index to return the accessed information; and
if the index is maintained in asynchronous current mode, then:
determining, from the one or more indications, whether any portion of the accessed information has been deleted or updated,
if a portion of the accessed information has been deleted or updated, responding to the request after removing said portion of the accessed information from the accessed information; and
examining the one or more indications for inserted and updated information that relates to the request.

12. The one or more machine-readable media of claim 11, wherein said certain conditions are satisfied by a user providing user input that specifies that the index is to be updated to reflect the changes.

13. The one or more machine-readable media of claim 11, wherein the indexed information is XML.

14. The one or more machine-readable media of claim 11, wherein:
a pending table stores the indications,
the indexed information is information in one or more documents, and
the certain conditions include at least one of:
the size of all documents, corresponding to pending changes stored in the pending table, exceeds a specified size, or
resource utili7ation has reached a specified level.

15. The one or more machine-readable media of claim 11, wherein each indication is associated with:
an opcode number, which identifies an operation being performed; and
a document identifier, which identifies a document affected by the operation.

16. The one or more machine-readable media of claim 15, wherein each indication is also associated with an order key value, which identifies a particular node or subtree in the document affected by the operation.

17. The one or more machine-readable media of claim 11, wherein the second operation comprises:
disabling the index and any secondary indexes,
for each indication,
if the operation associated with the indication is a deletion, deleting the index entries corresponding to the indication;
if the operation associated with the indication is an insertion, generating and inserting index entries corresponding to the indication; and
if the operation associated with the indication is an update, deleting the index entries corresponding to the indication, and generating and inserting index entries corresponding to the indication;
enabling the index and any secondary indexes; and
deleting all indications.

18. The one or more machine-readable media of claim 11, wherein the instructions, when executed by the one or more processors, further cause storing data that indicates whether the index is to be maintained asynchronously or synchronously, wherein if the data is changed to indicate that the index is to be maintained synchronously, then changes made to the indexed information during a subsequent operation causes the index to be changed during the subsequent operation.

19. The one or more machine-readable media of claim 11, wherein the instructions, when executed by the one or more processors, further cause, in response to user input, storing data that indicates whether the index is to be maintained in asynchronous stale mode or asynchronous current mode.

20. The one or more machine-readable media of claim 11, wherein:
the index is one of a plurality of related indexes;
the plurality of related indexes include the index and one or more secondary indexes; and a subset of the plurality of related indexes is synchronized more frequently than a different subset of the plurality of related indexes based on a second set of certain conditions.

* * * * *

UNITED STATES PATENT AND TRADEMARK OFFICE
CERTIFICATE OF CORRECTION

PATENT NO. : 8,566,300 B2  
APPLICATION NO. : 11/286873  
DATED : October 22, 2013  
INVENTOR(S) : Murthy et al.

Page 1 of 1

It is certified that error appears in the above-identified patent and that said Letters Patent is hereby corrected as shown below:

On the Title Page, Item [56]

On page 2, column 2, under "Other Publications", line 2, delete "XQuey" and insert -- XQuery --, therefor.

On page 3, column 2, under "Other Publications", line 23, delete "Wed" and insert -- Web --, therefor.

On page 3, column 2, under "Other Publications", line 31, delete "Preli Minary" and insert -- Preliminary --, therefor.

In the Claims

Column 14, line 22, in Claim 14, delete "utili7ation" and insert -- utilization --, therefor.

Signed and Sealed this  
Third Day of June, 2014

Michelle K. Lee  
*Deputy Director of the United States Patent and Trademark Office*